US006526640B1

(12) United States Patent
Li et al.

(10) Patent No.: US 6,526,640 B1
(45) Date of Patent: Mar. 4, 2003

(54) TOOL FOR INSTALLING SEAL RING

(75) Inventors: Ming-Je Li, Zhong-he (TW); Tung-Gan Cheng, Hsin-chu (TW); Wen-Lung Ho, Hsin-chu (TW); Tung-Lung Lai, Hsin-chu (TW); Ting-Han Ou, Gao-xiong (TW); Yen-Chi Chen, Yi-Ian (TW); Jan-Shen Liou, Gao-xiong (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/954,877

(22) Filed: Sep. 17, 2001

(51) Int. Cl.[7] .................................................. B23P 19/02
(52) U.S. Cl. .............................. 29/235; 29/451; 404/87
(58) Field of Search .......................... 29/235, 451, 432, 29/432.11, 432.2, 450; 7/103, 158; 227/156; 404/87, 79; 81/488

(56) References Cited

U.S. PATENT DOCUMENTS 2,246,263 A * 6/1941 Patterson ..................... 306/19
3,060,928 A * 10/1962 Lowe .......................... 128/57
3,667,105 A * 6/1972 Sharpe ........................ 29/235
4,341,002 A * 7/1982 Diba ........................... 29/235
4,347,838 A * 9/1982 McCauley ................... 128/33
4,578,851 A * 4/1986 Song ........................... 29/235
4,589,201 A * 5/1986 Kissinger ..................... 29/764
4,594,765 A * 6/1986 Kinnear ....................... 29/450
4,622,956 A * 11/1986 Nesheim ...................... 128/57
4,790,059 A * 12/1988 Killpack ...................... 29/451
4,989,585 A * 2/1991 Auker ......................... 128/57
5,072,471 A * 12/1991 Isler ............................ 71/158
6,115,897 A * 9/2000 Beals .......................... 29/235

* cited by examiner

*Primary Examiner*—Joseph J. Hail, III
*Assistant Examiner*—Daniel Shanley
(74) *Attorney, Agent, or Firm*—Tung & Associates

(57) ABSTRACT

A hand tool for rolling an O-ring under a downward pressure into a slot opening is described. The hand tool is constructed by a tool body that has an arcuate top surface adapted for gripping by a human hand and a planar bottom surface. The planar bottom surface of the tool body is provided with a cavity adapted for receiving a pair of rotatable balls mounted juxtaposed to each other. The pair of rotatable balls are mounted on a shaft through a center aperture of the balls in the cavity in such a way that only less than half of the spherical surface of the balls is protruding beyond the planar bottom surface of the tool body.

20 Claims, 1 Drawing Sheet

TOOL FOR INSTALLING SEAL RING

FIELD OF THE INVENTION

The present invention generally relates to a hand tool for installing a seal ring into a slot opening and more particularly, relates to a hand tool that is equipped with a pair of rotatable balls mounted on a bottom surface of the tool for installing an O-ring into a slot opening on a semiconductor processing equipment.

BACKGROUND OF THE INVENTION

Elastic sealing devices are frequently used in fabrication equipment when two adjoining surfaces are to be sealed together. The elastic sealing devices may be fabricated of a metal foil that is formed into V-shape with sufficient elasticity, or maybe a seal member of solid core formed of an elastic material. A suitable elastic material for forming the solid-core sealing device is an elastomer. One of such frequently used elastomeric sealing devices is a rubber O-ring for various sealing applications.

When the elastomeric O-ring is used as a sealing device, the O-ring should be fabricated of an elastomeric material that has sufficient elasticity and resiliency, i.e., compressive strength. The elastomeric material should have sufficient fatigue resistence such that the permanent set of the material after a long time usage is minimal and does not effect its sealing efficiency. Moreover, the elastomeric material used in fabricating the O-ring should have sufficient chemical resistence to frequently used gases and liquids of various chemical compositions, especially those that are of acidic or alkali nature.

An elastomeric O-ring, when used in sealing a planar surface, is frequently installed in a shallow slot opening provided in the planar surface. For instance, when the O-ring is fabricated in a circular cross-section, the slot opening may be provided in a rectangular cross-section for receiving the O-ring. The width of the rectangular cross-section of the slot opening is smaller than the outside diameter of the O-ring such that the O-ring may be pressed into the slot opening and securely spaced in the opening by frictional engagement. The task of installing an O-ring into a slot opening depends on several factors, i.e., the elasticity of the rubber material in the O-ring, the difference between the width of the slot opening and the outside diameter of the O-ring, the compressive modulars of the O-ring, etc. In certain applications, such as when the O-ring is used to seal around a metal target in a metal sputter chamber for processing semiconductor wafers, the O-ring may be formed of an elastomeric material that is sufficiently hard such that the installation of the O-ring into a slot opening surrounding the target can be a very difficult task. When attempts are made by pressing the O-ring into the slot opening by hand, not only a severe strain occurs in the hand, the O-ring may be installed not in a smooth manner but with kinks in the O-ring which affects its sealing efficiency.

It is therefore an object of the present invention to provide a tool for installing a seal ring into a slot opening that does not have the drawbacks or shortcomings of the conventional method for installing the seal ring by hand.

It is another object of the present invention to provide a tool for installing a seal ring into a slot opening wherein the tool is readily available in a factory environment.

It is a further object of the present invention to provide a tool for installing a seal ring into a slot opening wherein the tool can be provided inexpensively.

It is another further object of the present invention to provide a tool for installing a seal ring into a slot opening wherein the seal ring is placed in the slot opening in a smooth manner.

It is still another object of the present invention to provide a tool for installing a seal ring into a slot opening which is constructed by a tool body, a cavity in a bottom surface of the tool body, and a pair of rotatable balls mounting in the cavity.

It is yet another object of the present invention to provide a hand tool for rolling an O-ring into a slot opening that is constructed by a hemi-spherical-shaped tool body equipped with a pair of round balls rotatably mounted in a bottom surface of the tool body.

SUMMARY OF THE INVENTION

In accordance with the present invention, a tool for installing a seal ring into a slot opening that can be easily operated by hand is provided.

In a preferred embodiment, a tool for installing a seal ring into a slot opening is provided which includes a tool body that has an arcuate top surface adapted for gripping by human hand and a planar bottom surface; a cavity in the planar bottom surface adapted for receiving a pair of rotatable balls mounted juxtaposed to each other; and a pair of balls rotatable on a shaft through a center aperture of the balls mounted in the cavity in such a way that less than half of the spherical surface of the balls is protruding beyond the planner bottom surface of the tool body.

In the tool for installing a seal ring into a slot opening, the arcuate top surface may be a hemi-spherical surface. The tool may further include bearing means mounted in the aperture of the pair of balls for rotating on the shaft. The pair of balls each has a diameter that is within ±50% of a dimension of the seal ring. The tool body has a hemi-spherical shape with a diameter between about 3 cm and about 10 cm. The tool body may be fabricated of a material that has a rigidity of at least that of TEFLON (polytetrafluoroethylene), or fabricated of a material selected from the group consisting of TEFLON (polytetrafluoroethylene), ceramic and aluminum. The pair of balls are round, and may be fabricated of a material that has a lubricity of at least that of nylon, or may be fabricated of nylon or TEFLON (polytetrafluoroethylene). The shaft may be fabricated of a corrosion-proof material.

The present invention is further directed to a hand tool for rolling an O-ring into a slot opening that is constructed by a hemi-spherical-shaped tool body suitable for holding by a human hand, the hemi-spherical-shaped tool body has a planar bottom surface and a cavity in the planar bottom surface sufficiently large for receiving a pair of balls; and a pair of balls rotatably mounted juxtaposed to each other on a shaft through a center aperture provided in the pair of balls, the shaft may be mounted on two extreme ends in two opposing sidewalls of the cavity in the planar bottom surface in such a way that no more than half of the spherical surface of the pair of balls protrudes outside the cavity beyond the planar bottom surface.

In the hand tool for rolling an O-ring into a slot opening, the pair of balls are most likely round, and each has a diameter which is in within ±50% of a diameter of the O-ring. The tool may further include bearing means mounted in the aperture of the pair of balls for rotating on the shaft. The hemi-spherical-shaped tool body may have a diameter between about 3 cm and about 10 cm, and may be fabricated of a material that has a rigidity of at least that of TEFLON (polytetrafluoroethylene), or may be fabricated of a material selected from the group consisting of TEFLON (polytetrafluoroethylene), ceramic and aluminum. The pair of balls may be fabricated of a material that has a lubricity of at least that of nylon, i.e., or may be fabricated of nylon and TEFLON (polytetrafluoroethylene).

BRIEF DESCRIPTION OF THE DRAWINGS

These and other objects, features and advantages of the present invention will become apparent from the following detailed description and the appended drawings in which.

DETAILED DESCRIPTION OF THE PREFERRED AND ALTERNATE EMBODIMENT

The present invention discloses a tool for installing a seal ring into a slot opening provided on a semiconductor fabrication equipment. The tool includes a tool body, a cavity in the bottom surface of the tool body, and a pair of rotatable balls mounted in the cavity for contacting a seal ring during the installation of the latter into a slot opening.

The tool body of the present invention hand tool is normally fabricated of an arcuate top surface that is convenient for gripping by a human hand. The tool body further has a flat planar bottom surface provided with a cavity therein for receiving a pair of balls rotatably mounted juxtaposed to each other, and the pair of rotatable balls are mounted on a shaft through a center aperture of the balls in the cavity such that less than half of the spherical surface of the balls is protruding beyond the bottom surface of the tool body. The seal ring installed by the present invention hand tool may be an elastomeric O-ring that is frequently used in sealing surfaces in a semiconductor process equipment.

Figure 1:
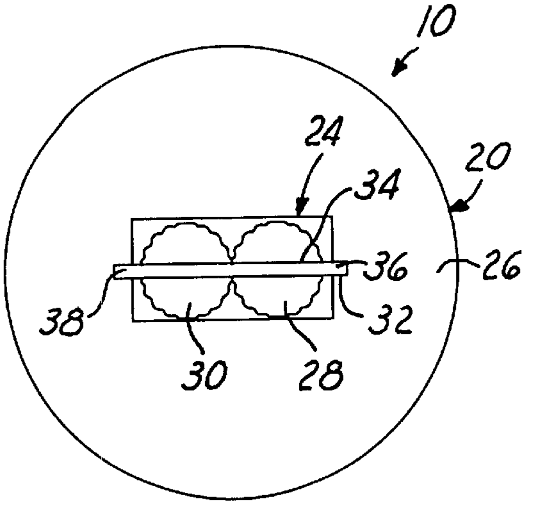
FIG. 1 is a bottom view of a present invention hand tool.
Figure 2:
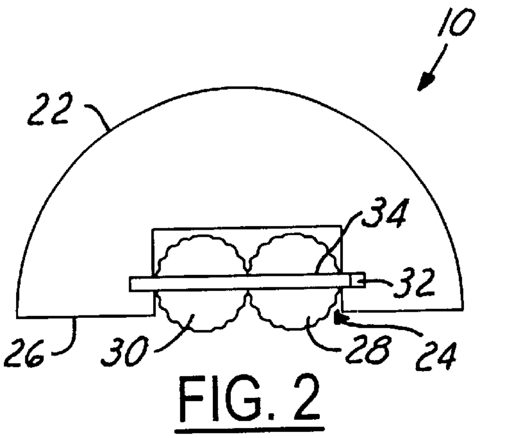
FIG. 2 is a cross-section view of the present invention tool.

Referring initially to FIG. 1, wherein a bottom view of the present invention hand tool 10 is shown. The hand tool 10 is constructed of a tool body 20 that has an arcuate top surface 22 adapted for gripping by a human hand. In the preferred embodiment, the arcuate top surface is a hemispherical surface shown in FIGS. 2 and 3. The tool body 20 is further provided with a cavity 24 in a planar bottom surface 26 for receiving a pair of rotatable balls 28, 30 that are mounted adjacent to each other on a shaft 32 through a center aperture 34 of the balls 28, 30. The pair of rotatable balls 28, 30 rotates on the shaft 32 which is mounted in the cavity 24 at two extreme ends 36, 38.

Figure 4:
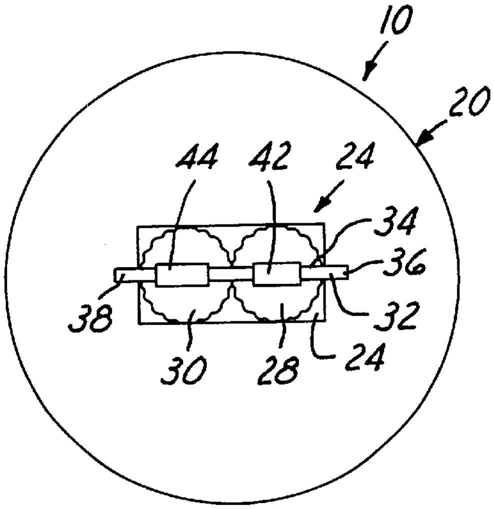
FIG. 4 is the bottom view of an alternate embodiment of the present invention hand tool.
Figure 5:
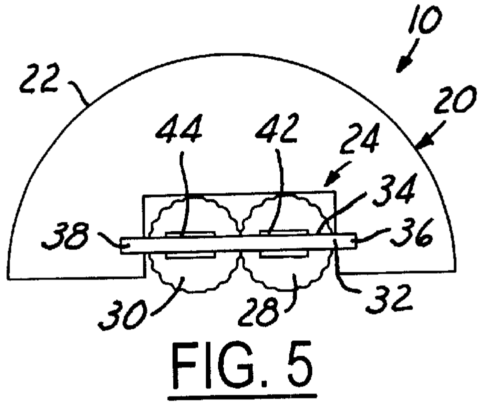
FIG. 5 is a cross-sectional view of the alternate embodiment of the present invention hand tool shown in FIG. 4.

In an alternate embodiment shown in FIGS. 4 and 5, bearing means 42, 44 are further provided in the apertures 34 in the pair of rotatable balls 28, 30 to facilitate the rotation of the balls 28, 30.

The pair of balls 28, 30 each has a diameter that is substantially similar to a diameter of the O-ring 50 onto which the balls are pressed against. This is shown is FIG. 3. The term "substantially similar" means a diameter that is within ±50% of the diameter of the O-ring 50. In the preferred embodiment, the tool body 20 has a hemispherical shape with a diameter between about 3 cm and about 10 cm, i.e., in a size that is suitable for gripping by a human hand. The tool body is fabricated of a material that has a rigidity of at least the rigidity of TEFLON (polytetrafluoroethylene). For instance, the tool body 20 can be fabricated of a material selected from the group consisting of TEFLON (polytetrafluoroethylene), ceramic and aluminum.

In the preferred embodiment, the pair of balls 28, 30 are provided in a circular, or round shape. However, other suitable shapes for the ball such as oval may also suffice in the present invention device. The pair of balls 28, 30 can be fabricated of a material that has a sufficient lubricity, for instance, that has a lubricity at least equal to that of nylon. A preferred material used in the preferred embodiment is nylon or TEFLON (polytetrafluoroethylene). The shaft 32 that the balls 28, 30 rotate on should be made of a corrosion-proof or corrosion-resistant material. The O-ring that the present invention novel tool is pressed on may be wet or contaminated by a chemical solution such as acid.

Figure 3:
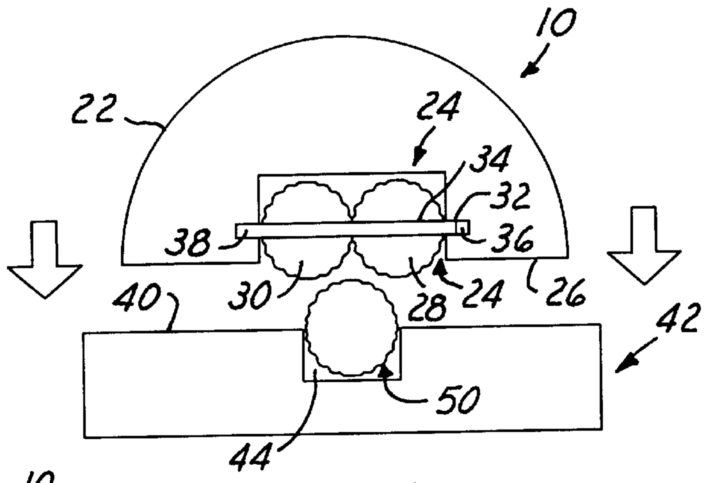
FIG. 3 is cross-section view of the present invention tool used on pressing an O-ring into a slot opening.

The operation of the present invention novel hand tool for rolling an O-ring into a slot opening is shown in FIG. 3. A surface 40 of a fabrication equipment 42 is provided with a slot opening 44 which may be suitably in a rectangular, or square shape. The width of the rectangular opening 44 should be smaller than the outside diameter of the O-ring 50 to be inserted therein such that a frictional engagement between the two retains the O-ring 50 inside the slot opening 44. As shown in FIG. 3, after a downwardly pressure is applied on the present invention hand tool 10, the rotatable balls 28, 30 touches the O-ring 50 and applies the downward pressure onto the O-ring 50 to push it into the slot opening 44. By moving, or rolling the balls 28, 30 on the O-ring 50 along the length of the O-ring, the entire length of O-ring 50 can be inserted into the slot opening 44 to complete the O-ring installation step. The present invention novel method therefore avoids strain or fatigue on the human hand when an O-ring 50 is manually pressed into the slot opening 44.

The present invention novel hand tool for installing an O-ring into a slot opening has therefore been amply described in the above description and in the appended drawings of FIGS. 1–5.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows.

What is claimed is:

1. A tool for installing a seal ring into a slot opening comprising:

a tool body having an arcuate top surface for gripping by human hand and a planar bottom surface forming a cavity therein-between; and a pair of rotatable balls rotatably mounted on a shaft juxtaposed to each other through a center aperture of the balls mounted in said cavity in such a way that less than half of the spherical surface of the balls is protruding beyond said planar bottom surface of the tool body.

2. A tool for installing a seal ring into a slot opening according to claim 1, wherein said arcuate top surface is a hemispherical surface.

3. A tool for installing a seal ring into a slot opening according to claim 1 further comprising a bearing means mounted in said aperture of said pair of balls for rotating on said shaft.

4. A tool for installing a seal ring into a slot opening according to claim 1, wherein said pair of balls each having a diameter that is within ±50% of a dimension of said seal ring the pair of balls are designed to press on.

5. A tool for installing a seal ring into a slot opening according to claim 1, wherein said tool body has a hemi-spherical shape with a diameter between about 3 cm and about 10 cm.

6. A tool for installing a seal ring into a slot opening according to claim 1, wherein said tool body is fabricated of a material that has a rigidity of at least that of polytetrafluoroethylene.

7. A tool for installing a seal ring into a slot opening according to claim 1, wherein said tool body is fabricated of a material selected from the group consisting of polytetrafluoroethylene, ceramic and aluminum.

8. A tool for installing a seal ring into a slot opening according to claim 1, wherein said pair of balls are round.

9. A tool for installing a seal ring into a slot opening according to claim 1, wherein said pair of balls are fabricated of a material that has a lubricity of at least that of nylon.

10. A tool for installing a seal ring into a slot opening according to claim 1, wherein said pair of balls are fabricated of nylon or polytetrafluoroethylene.

11. A tool for installing a seal ring into a slot opening according to claim 1, wherein said shaft is fabricated of a corrosion-proof material.

12. A hand tool for rolling an O-ring into a slot opening comprising:

a hemi-spherical shaped tool body suitable for holding by a human hand, said hemi-spherical shaped tool body having a planar bottom surface and a cavity in said planar bottom surface sufficiently large for receiving a pair of balls; and said pair of balls rotatably mounted juxtaposed to each other on a shaft through a center aperture provided in said pair of balls, said shaft being mounted on two extreme ends in two opposing sidewalls of said cavity in said planar bottom surface in such a way that no more than half of the spherical surface of said pair of balls protrudes outside said cavity beyond said planar bottom surface.

13. A hand tool for rolling an O-ring into a slot opening according to claim 12, wherein said pair of balls are round.

14. A hand tool for rolling an O-ring into a slot opening according to claim 12, wherein said pair of balls are round and each having a diameter that is within ±50% of a diameter of said O-ring.

15. A hand tool for rolling an O-ring into a slot opening according to claim 12 further comprising a bearing means mounted in said aperture of said pair of balls for rotating on said shaft.

16. A hand tool for rolling an O-ring into a slot opening according to claim 12, wherein said hemi-spherical-shaped tool body has a diameter between about 3 cm and about 10 cm.

17. A hand tool for rolling an O-ring into a slot opening according to claim 12, wherein said tool body is fabricated of a material that has a rigidity of at least that of polytetrafluoroethylene.

18. A hand tool for rolling an O-ring into a slot opening according to claim 12, wherein said tool body is fabricated of a material selected from the group consisting of polytetrafluoroethylene, ceramic and aluminum.

19. A hand tool for rolling an O-ring into a slot opening according to claim 12, wherein said pair of balls are fabricated of a material that has a lubricity of at least that of nylon.

20. A hand tool for rolling an O-ring into a slot opening according to claim 12, wherein said shaft is fabricated of a corrosion-proof material.

* * * * *